United States Patent [19]

Le Page et al.

[11] 4,250,056

[45] Feb. 10, 1981

[54] CATALYSTS FOR HYDROREFORMING

[75] Inventors: Jean-Francois Le Page, Rueil-Malmaison; Germain Martino, Poissy; Jean Miquel, Paris, all of France

[73] Assignee: Societe Francaise des Produits pour Catalyse, Rueil-Malmaison, France

[21] Appl. No.: 112,260

[22] Filed: Jan. 15, 1980

Related U.S. Application Data

[62] Division of Ser. No. 858,971, Dec. 9, 1977, Pat. No. 4,214,980.

[30] Foreign Application Priority Data

Dec. 9, 1976 [FR] France .................................. 76 37413

[51] Int. Cl.³ ........................ B01J 21/04; B01J 23/62; B01J 23/64; B01J 27/08
[52] U.S. Cl. ..................................... 252/441; 252/442

[58] Field of Search ................... 252/441, 442, 466 PT

[56] References Cited

U.S. PATENT DOCUMENTS 3,415,737  12/1968  Kluksdahl ...................... 252/466 PT
3,871,995  3/1975  Duhaut et al. ................... 208/139 X Primary Examiner—W. J. Shine
Attorney, Agent, or Firm—Millen & White

[57] ABSTRACT

Process for reforming hydrocarbons or producing aromatic hydrocarbons under severe operating conditions, in the presence of a catalyst comprising an alumina carrier and, expressed by weight with respect to alumina:

(a) from 0.05 to 0.6% of platinum
(b) from 0.01 to 2% of rhenium
(c) from 0.05 to 3% of thallium or indium, and
(d) from 0.1 to 10% of a halogen.

17 Claims, No Drawings

CATALYSTS FOR HYDROREFORMING

This is a division, or application Ser. No. 858,971 filed Dec. 9, 1977, now U.S. Pat. No. 4,214,980.

This invention relates to new catalysts and a catalytic reforming process as well as a catalytic process for manufacturing aromatic hydrocarbons, said processes being conducted under severe conditions and in the presence of one of these new catalysts. These processes are conducted at a temperature from 510° to 600° C. under a pressure from 1 to 13 kg/cm$^2$ at a hourly space velocity from 1 to 10 volumes of liquid charge per volume of catalyst, the ratio hydrogen/hydrocarbons being from 5 to 20.

More precisely, these new catalysts can be used for:

Reforming reactions, in order to obtain a gasoline with a clear octane number of at least 102. The severe conditions of the catalytic hydroreforming reactions are more particularly as follows: average temperature from about 510° to 580° C., pressure from about 5 to 18 kg/cm$^2$, preferably 6 to 13 kg/cm$^2$, hourly space velocity from 1 to 10 volumes of liquid naphtha per volume of catalyst and recycle rate from 6 to 10 moles of hydrogen per mole of charge. The charge is generally a naphtha distilling between about 60° C. and about 220° C., particularly a straight run naphtha.

Reactions for producing aromatic hydrocarbons from saturated or unsaturated gasolines (for the production of benzene, toluene and xylenes). In the case of an unsaturated charge, i.e. which contains diolefins and monoolefins, the charge must be first made free thereof by selective or total hydrogenation. Subsequently, the charge, free of substantially all diolefins and monoolefins previously contained therein, is subjected to a treatment with hydrogen in the presence of a catalyst at a temperature from about 530° to 600° C., under a pressure from 1 to 13 kg/cm$^2$, the hourly feed rate by volume of the liquid charge being of about 1 to 10 times the volume of the catalyst, the molar ratio hydrogen/hydrocarbons being from about 6 to 20. The charge may consist of pyrolysis gasoline, cracking gasoline, particularly steam-cracking gasoline, or catalytic reforming gasoline or still may consist of naphthenic hydrocarbons convertible to aromatic hydrocarbons by dehydrogenation.

Catalysts containing platinum deposited on alumina have been known for a long time. But, in spite of a number of improvements made to these catalysts, for example by incorporating thereto one, two or even three additives such as rhenium, germanium, tungsten, molybdenum or several other metals of any group of the periodic classification of elements, it is still desired today to find new catalysts which, on the one hand, would give still better yields than those obtained up to now and which, on the other hand, would have a longer life time than that of the known catalysts. In addition, an attempt is made to improve the mechanical properties of these catalysts in order to allow their use in a moving bed in the form of conglomerates, for example balls or extrudates of a substantial size, so as to leave a relatively free passageway to gaseous reactants. The wear of these catalysts results in the formation of much thinner grains which clog progressively the free space and oblige to increase the inlet pressure of the reactants or even to discontinue the operation. While it was known that in reforming reactions high yields were obtained particularly by use of a catalyst with a porous carrier base (particularly alumina) containing, for example, simultaneously platinum and/or another noble metal of the platinum family, and another metal such, for example, as copper, gold, silver and iridium, it has been now discovered that when proceeding in the presence of other specific catalysts, specially in a moving bed, the latter catalysts exhibited, in the reactions of hydroreforming and aromatic hydrogcarbon production, an increased activity and, above all, an increased lifetime as compared to the prior art catalysts.

The specific catalyst used in this invention comprises an alumina carrier, platinum, rhenium, thallium or indium and a halogen, for example chlorine or fluorine.

The catalyst of the invention contains, expressed by weight with respect to the alumina carrier: (a) from 0.05 to 0.6% and more particularly 0.1 to 0.3% of platinum, (b) 0.01 to 2% and preferably 0.1 to 0.25% of rhenium, (c) from 0.05 to 3%, preferably 0.07 to 2% and, more particularly, 0.3 to 0.6% of thallium or indium and (d) from 0.1 to 10% and preferably 0.2 to 5%, by weight with respect to the alumina carrier, of a halogen, for example chlorine or fluorine.

The textural characteristics of the alumina may also be of importance: in order to proceed with sufficiently high space velocities while avoiding the use of reactors of excessively large capacity and of an excessive amount of catalyst, the specific surface of the alumina may be advantageously from 50 to 600 m$^2$ per gram, preferably from 150 to 400 m$^2$/g.

The catalyst may be prepared according to conventional methods consisting of impregnating the alumina with solutions of compounds of the metals to be introduced; either with a common solution of these metal compounds or with a separate solution for each metal compound.

When using several solutions, intermediate drying and/or calcination steps may be performed. The operation is completed by a calcination, e-g at about 500° to 1000° C., preferably in the presence of free oxygen, for example by air scavenging.

Examples of metal compounds introduced in the composition of the catalyst are the nitrates, chlorides, bromides, fluorides, sulfates, ammonium salts or acetates of these metals or even any other salt or oxide of these metals soluble in water, in hydrochloric acid or in any other suitable solvent.

The halogen of the catalyst may be supplied from one of the metal halides when the metal is introduced as a halide, or may be introduced in the form of hydrochloric acid, hydrofluoric acid, ammonium chloride, ammonium fluoride, gaseous chloride or hydrocarbon halide, e.g CCl$_4$, CH$_2$Cl$_2$ or CH$_3$Cl.

A first method of preparation consists, for example, of impregnating the carrier with an aqueous solution of indium or thallium nitrate or other compound, drying at about 120° C. and calcining in air for a few hours at a temperature from 500° to 1000° C., preferably about 700° C.; a second impregnation will then be performed with a solution containing rhenium and platinum.

Another method consists, for example, of impregnating the carrier with a solution containing simultaneously the three metals of the catalyst.

Still another method consists of introducing the metal elements by a number of successive impregnations equal to the number of metal elements to be introduced into the catalyst.

The production of a gasoline of very high octane number necessitates the use of very severe conditions which are not easily withstood by the catalysts used up to now. The use of bimetallic catalysts, however, resulted in a significant improvement. Numerous attempts to associate various metals have been made and, recently, catalyst compositions containing up to 4 metals have been proposed. These compositions, in fact, resulted in an improvement but, generally, the promoters, when favorable to the stability properties, unhappily exhibit, particularly as concerns noble metals of the platinum family, a certain tendency to hydrogenolysis, which definitely results in decreased yields, in a shortening of the cycle period and in a decrease of the possible number of cycles, i.e. in a decrease of the life-time in the catalyst.

On the contrary, the simultaneous use of rhenium and thallium or indium in combination with platinum, very significantly reduces this hydrogenolyzing tendency, and it has been observed that the benefits resulting from the simultaneous use of rhenium and thallium or indium are maximum in the case of very severe operating conditions, particularly under low pressures, high temperatures and long operating periods.

The following examples illustrate the invention without however limiting the scope thereof.

EXAMPLE 1

The naphtha subjected to the treatment, under conventional operating conditions, has the following characteristics:

| ASTM distillation | | 80–160° C. |
|---|---|---|
| Composition: | aromatic hydrocarbons | 7% by weight |
| | naphthenic hydrocarbons | 27% by weight |
| | paraffinic hydrocarbons | 66% by weight |
| "Clear research" octane number | | about 37 |
| Average molecular weight | | 110 |
| Specific gravity at 20° C. | | 0.782 |

This naphtha is passed with recycled hydrogen over two catalysts A and B containing 0.2% of platinum, 0.2% of rhenium, expressed by weight with respect to the carrier consisting of alumina having a specific surface of 240 m$^2$/g and a pore volume of 57 cc/g; the chlorine content of catalyst A and B is 1.12%. The catalys A further contains 0.5% of thallium and the catalyst B further contains 0.5% of indium (expressed by weight with respect to the carrier).

The catalysts A and B have been prepared by adding to 100 g of alumina 100 cc of an aqueous solution containing:

1.90 g of concentrated HCl (d = 1.19), 10 g of an aqueous solution of chloroplatinic acid having a 2% platinum content, 8.00 g of a perrhenic acid solution containing 2.5% by weight of rhenium, and 1.06 g of thallium nitrate for catalyst A, or 1.87 g of indium nitrate for catalyst B.

The contact being maintained for 5 hours, the resulting product is dried for 1 hour at 100° C., then roasted at 530° C. in dry air (air dried by means of activated alumina), then reduced with a stream of dry hydrogen (activated alumina) for 2 hours at 450° C. The resulting catalysts A and B contain:

0.2% of platinum
0.2% of rhenium
0.5% of thallium (catalyst A) or 0.5% of indium (catalyst B)
1.12% of chlorine.

The resulting catalysts A and B have a specific surface of 230 m$^2$/g and a pore volume of 54 cc/g.

The operating conditions are so selected as to obtain a clear octane number of 96.2.

The conventional mild operating conditions are as follows:

| pressure | 20 bars |
|---|---|
| temperature | 490° C. |
| ratio H$_2$/hydrocarbon (moles) | 5 |
| naphtha weight/catalyst weight/hour | 3 |

Table I below indicates, for catalysts A and B, the yield of C$_5^+$ and the hydrogen content of the recycled gas when the desired octane number has been obtained.

TABLE I

| CATA-LYST | METAL % B.W. WITH RESPECT TO ALUMINA | | | YIELD C$_5^+$ (weight) | RECYCLED GAS % H$_2$ (molar) |
|---|---|---|---|---|---|
| A | 0.2% platinum | 0.2% rhenium | 0.5% thallium | 82.8 | 82.8 |
| B | 0.2% platinum | 0.2% rhenium | 0.5% indium | 82.6 | 82.5 |

EXAMPLE 1.A. (comparative)

Example 1 is repeated with the use of a catalyst C containing 0.2% of platinum and 0.2% of rhenium, a catalyst D containing 0.2% of platinum and 0.5% of thallium and a catalyst E containing 0.2% of platinum and 0.5% of indium. These catalysts all contain 1.12% of chlorine. The results obtained are slightly lower than those obtained with catalysts A and B, these results being reported in Table II below.

TABLE II

| CATA-LYST | METAL % B.W. WITH RESPECT TO ALUMINA | | | YIELD C$_5^+$ (weight) | RECYCLED GAS % H$_2$ (molar) |
|---|---|---|---|---|---|
| C | 0.2% platinum | 0.2% rhenium | — | 82.5 | 82.6 |
| D | 0.2% platinum | — | 0.5% thallium | 82.5 | 82.6 |
| E | 0.2% platinum | — | 0.5% indium | 82.1 | 82.5 |

In fact, the catalysts according to this invention have proved their superiority essentially in a process conducted under severe conditions as shown in example 2.

EXAMPLE 2

The same charge as in example 1 is used to produce a gasoline having a clear octane number of 103. The operating conditions are as follows:

of the reactor be progressively renewed by fresh catalyst, for example in about 500 hours.

TABLE III

| CATA-LYST | METAL % WITH RESPECT TO THE CATALYST CARRIER | | | $C_5^+$ YIELD (weight) | RECYCLED GAS % $H_2$ (molar) |
|---|---|---|---|---|---|
| A | 0.2 platinum | 0.2 rhenium | 0.5 thallium | 80.0 | 79.6 |
| F | 0.2 platinum | — | — | 73.2 | 72.8 |
| C | 0.2 platinum | 0.2 rhenium | — | 76.1 | 75.3 |
| D | 0.2 platinum | — | 0.5 thallium | 76.6 | 76.1 |
| B | 0.2 platinum | 0.2 rhenium | 0.5 indium | 79.9 | 79.5 |
| E | 0.2 platinum | — | 0.5 indium | 75.5 | 75.2 |
| G | 0.2 platinum | 0.2 iridium | 0.5 thallium | 79.6 | 78.4 |
| H | 0.2 platinum | 0.08 iridium | 0.5 thallium | 79.6 | 78.5 |
| I | 0.2 platinum | 0.2 iridium | 0.5 indium | 79.5 | 79.2 |
| J | 0.2 platinum | 0.08 iridium | 0.5 indium | 79.6 | 79.2 |
| K | 0.2 platinum | 0.08 iridium | — | 75.1 | 74.8 |
| L | 0.2 platinum | 0.08 ruthenium | — | 75.1 | 74.8 |
| M | 0.2 platinum | 0.2 ruthenium | — | 75.0 | 74.6 |
| N | 0.2 platinum | 0.08 ruthenium | 0.5 iron | 79.4 | 78.5 |
| O | 0.2 platinum | 0.08 ruthenium | 0.5 rhodium | 79.4 | 78.7 |
| P | 0.2 platinum | 0.08 ruthenium | 0.5 manganese | 79.5 | 78.8 |
| Q | 0.2 platinum | — | 0.5 manganese | 77.8 | 77.5 |
| R | 0.2 platinum | 0.08 ruthenium | 0.5 gold | 79.7 | 78.7 |
| S | 0.2 platinum | — | 0.5 gold | 77.5 | 77.9 |
| T | 0.2 platinum | 0.08 iridium | 0.5 uranium | 79.4 | 78.8 |
| U | 0.2 platinum | 0.08 iridium | 0.5 gallium | 77.9 | 77.7 |

| | |
|---|---|
| pressure | 10 bars |
| temperature | 530° C. |
| molar ratio H$_2$/hydrocarbons | 8 |
| naphtha weight/catalyst weight/hour | 1.65 |

The operation is conducted in the presence of catalysts A and B according to the invention as well as in the presence of various catalysts not conforming with the invention, comprising 1, 2 or 3 metal elements. All the catalysts contain 1.12% of chlorine.

In Table III below are reported the $C_5^+$ yield and the hydrogen content of the recycled gas obtained after 200 hours of run.

The results obtained in this example 2 with the catalysts according to the invention may be maintained over very long time periods of, for example, several months, by operating continuously in a moving bed reactor, the catalyst being withdrawn, for example, in a continuous manner, at a rate so adjusted that the whole catalyst bed

EXAMPLE 3

Example 2 is repeated with catalysts containing platinum, rhenium, thallium or indium, with varying contents of rhenium, thallium or indium.

The metal contents and the obtained results are reported in Table IV below. All the catalysts contain 1.12% of chlorine.

TABLE IV

| CATA-LYST | METAL % BY WEIGHT WITH RESPECT TO THE CATALYST CARRIER | | | $C_5^+$ YIELD (weight) | RECYCLED GAS % $H_2$ (molar) |
|---|---|---|---|---|---|
| $A_1$ | 0.2 platinum | 0.2 rhenium | 0.02 thallium | 76.1 | 75.3 |
| $A_2$ | 0.2 platinum | 0.2 rhenium | 0.07 thallium | 78.1 | 77.7 |
| $A_3$ | 0.2 platinum | 0.2 rhenium | 0.35 thallium | 80.0 | 79.5 |
| A | 0.2 platinum | 0.2 rhenium | 0.5 thallium | 80.0 | 79.6 |
| $A_4$ | 0.2 platinum | 0.2 rhenium | 0.7 thallium | 78.2 | 77.7 |
| $A_5$ | 0.2 platinum | 0.2 rhenium | 2.5 thallium | 77.8 | 77.4 |
| $A_6$ | 0.2 platinum | 0.2 rhenium | 4 thallium | 75.5 | 74.9 |
| $B_1$ | 0.2 platinum | 0.2 rhenium | 0.02 indium | 76.1 | 75.3 |
| $B_2$ | 0.2 platinum | 0.2 rhenium | 0.07 indium | 77.7 | 77.4 |
| $B_3$ | 0.2 platinum | 0.2 rhenium | 0.35 indium | 79.8 | 79.5 |
| B | 0.2 platinum | 0.2 rhenium | 0.5 indium | 79.9 | 79.5 |
| $B_4$ | 0.2 platinum | 0.2 rhenium | 0.7 indium | 77.8 | 77.4 |
| $B_5$ | 0.2 platinum | 0.2 rhenium | 2.5 indium | 75.2 | 74.9 |
| $B_6$ | 0.2 platinum | 0.2 rhenium | 4 indium | 74.3 | 73.8 |
| $V_1$ | 0.2 platinum | 0.009 rhenium | 0.5 thallium | 76.6 | 76.1 |
| $V_2$ | 0.2 platinum | 0.009 rhenium | 0.5 indium | 75.5 | 75.2 |
| $V_3$ | 0.2 platinum | 0.05 rhenium | 0.5 thallium | 77.8 | 77.4 |
| $V_4$ | 0.2 platinum | 0.05 rhenium | 0.5 indium | 76.9 | 76.2 |
| $V_5$ | 0.2 platinum | 0.30 rhenium | 0.5 thallium | 77.9 | 77.4 |
| $V_6$ | 0.2 platinum | 0.30 rhenium | 0.5 indium | 77.0 | 76.4 |
| $V_7$ | 0.2 platinum | 3 rhenium | 0.5 thallium | 75.3 | 74.5 |
| $V_8$ | 0.2 platinum | 3 rhenium | 0.5 indium | 74.7 | 73.6 |

What we claim is:

1. A catalyst comprising an alumina carrier and, expressed by weight with respect to alumina:
   (a) from 0.05 to 0.6% of platinum,
   (b) from 0.01 to 2% of rhenium,
   (c) from 0.05 to 3% of thallium or indium, and
   (d) from 0.1 to 10% of halogen.

2. A catalyst according to claim 1, containing 0.1 to 0.3% of platinum, 0.1 to 0.25% of rhenium and 0.07 to 2% of thallium or indium.

3. A catalyst according to claim 2, containing from 0.3 to 0.6% of thallium or indium.

4. A catalyst according to claim 3, containing thallium.

5. A catalyst according to claim 3, containing indium.

6. A catalyst according to claim 1, wherein the specific surface of the alumina is 50-600 square meters per gram.

7. A catalyst according to claim 1, wherein the specific surface of the alumina is 150-400 meters per gram.

8. A catalyst consisting essentially of an alumina carrier and, expressed by weight with respect to alumina:
(a) from 0.05 to 0.6% of platinum,
(b) from 0.01 to 2% of rhenium,
(c) from 0.05 to 3% of thallium, and
(d) from 0.1 to 10% of halogen.

9. A catalyst according to claim 8, said catalyst containing 0.1 to 0.3% of platinum, 0.1 to 0.25% of rhenium and 0.07 to 2% of thallium.

10. A catalyst according to claim 9, said catalyst containing from 0.3 to 0.6% of thallium.

11. A catalyst according to claim 8, wherein the specific surface of the alumina is 50-600 square meters per gram.

12. A catalyst according to claim 8, wherein the specific surface of the alumina is 150-400 meters per gram.

13. A catalyst consisting essentially of an alumina carrier and, expressed by weight with respect to alumina:
(a) from 0.05 to 0.6% platinum,
(b) from 0.01 to 2% rhenium,
(c) from 0.05 to 3% of indium, and
(d) from 0.1 to 10% of halogen.

14. A catalyst according to claim 13, said catalyst containing 0.1 to 0.3% of platinum, 0.1 to 0.25% of rhenium and 0.07 to 2% of indium.

15. A catalyst according to claim 14, said catalyst containing from 0.3 to 0.6% of indium.

16. A catalyst according to claim 13, wherein the specific surface of the alumina is 50-600 square meters per gram.

17. A catalyst according to claim 13, wherein the specific surface of the alumina is 150-400 meters per gram.

* * * * *